May 19, 1970     H. GREBER     3,513,337
ELECTROMAGNETIC GAS-DYNAMIC ENERGY CONVERTER
Filed Sept. 6, 1968
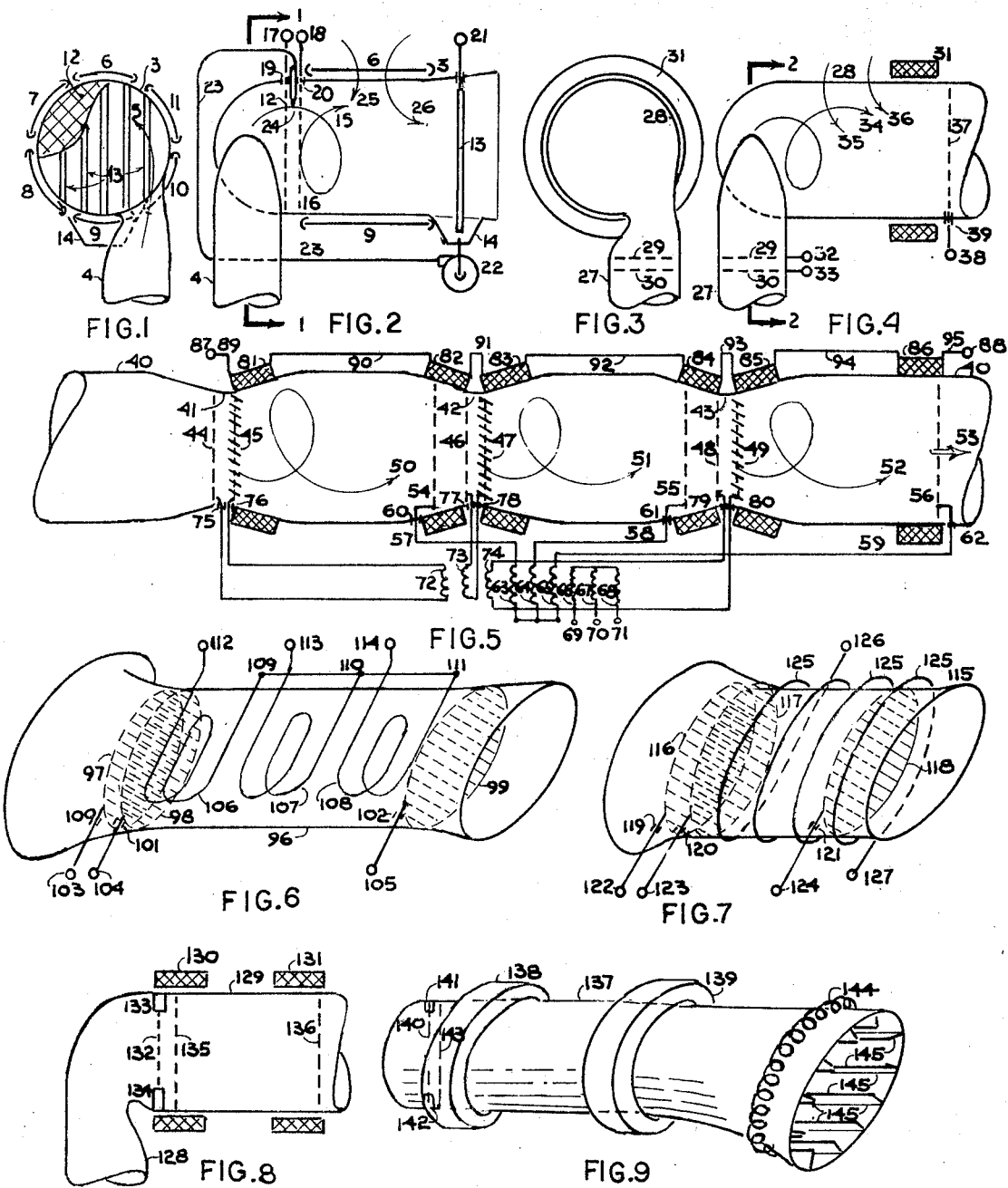

United States Patent Office 3,513,337
Patented May 19, 1970

3,513,337
ELECTROMAGNETIC GAS-DYNAMIC ENERGY CONVERTER
Henry Greber, 225 W. 80th St., Apt. 8–D,
New York, N.Y. 10024
Filed Sept. 6, 1968, Ser. No. 757,992
Int. Cl. H02n 4/02
U.S. Cl. 310—11                                4 Claims

ABSTRACT OF THE DISCLOSURE

An electromagnetic device for direct conversion of the kinetic energy of a fluid, particularly of a gas, into electric energy. This is accomplished by ionizing the gas molecules, so that ions of a given sign are carried by the gas stream from an electrode of opposite sign to a collecting electrode installed downstreams. The gas is introduced transversally into a tube, by means of a nozzle perpendicular to the axis of that tube, or through directing vanes, so that it rotates in the tube. The rotating gas is exposed to the influence of a magnetic flux perpendicular to the direction of the gas rotation, so that an induced electromotoric force acting on said ions is directed in the same way as is the potential gradient due to the removal of the same ions from the oppositely charged electrode. If three pairs of ionizing electrodes and three collecting electrodes are installed along the gas duct, the device can function as a converter of kinetic gas power into three-phase power. This converter can also function as an asynchronous generator at commercial power frequencies, or at high frequencies as a traveling wave amplifier or oscillator. The application of this device for the reduction of the sonic boom and drag of aircraft is given.

---

The objective of this invention is to provide means for direct conversion of the thermal and kinetic energy of a fluid, and particularly of a gas, such as air compressed in a stell bottle, or pressurized steam in a boiler into electric energy. Another objective of this invention is the direct conversion of the kinetic energy of a liquid such as water into electric energy. Its further objective is to provide a gas compressor or blower, or a pump for liquids respectively. A still further purpose of this invention is to provide a converter without moving parts in which the kinetic energy of a fluid can be directly converted into poly-phase and particularly into three-phase current of commercial power frequency, and which can also operate as a three-phase asynchronous generator, and also as a traveling wave amplifier or oscillator for high frequencies. The purposes of this invention also include the provision of means for seeding the fluid stream and regaining the seeds by means of precipitation. Finally, it is also the objective of this specification to create a means for reduction of the sonic boom and drag or airborne objects, such as aircraft.

All these objectives are achieved by means of utilization of the following physical principle. If a fluid, and particularly a gas flowing through a pipe is ionized, by corona discharge, or by exposing it to a radioactive isotope, or other ionizing radiation, and the negative ions, usually the electrons are neutralized on a positive electrode, the potential of the positive ions which remain in the gas stream is raised by carrying them along with the gas stream which overcomes the electrostatic attraction of these ions to the negative electrode. The work performed by the gas stream on the positive ions appears as their elevated potential, which is transferred to the collecting electrode. Thus the kinetic energy of the gas is directly converted into electric energy. In addition to this electrostatic effect an electromagnetic effect also takes place at the same time. Through suitable arrangements, such as an inlet nozzle perpendicular to the gas duct, or directing vanes installed at the entrance to this duct, a rotation of the gas stream is achieved. The rotating gas containing the ions is exposed to the influence of a radial magnetic flux. This flux induces in the ions an electromagnetic force which acts in the same direction as the potential difference due to their removal from the electrode of opposite sign. If the radial magnetic flux is not stationary, but rotates or travels, the converter can be used as an asynchronous generator which can function even without collecting electrodes. Through the interaction of the ions in the gas stream with traveling waves flowing along a helical winding installed on the gas duct the converter can function as a travelling wave amplifier or oscillator for high frequency. The same kinds of functions can be achieved if instead of an ionizing gas, a dissociated liquid, such as water is used in the duct. It is obvious that the transfer of energy from fluid stream to the windings around the duct, is not a one way street. The converter can also be used for acceleration of a gas or liquid stream in the duct, and act as a gas compressor or gas blower, or a pump for liquids.

The main advantage of this converter is its simplicity, absence of moving parts, and its high efficiency. Other advantage include the reduction of air pollution, the elimination of thermal pollution, since no water is required for condensation. Its major appeal is its direct conversion of the kinetic energy of a fluid into electric energy, be it in form of DC or AC. The nature of this converter, its specific properties and possible applications are described in this specification and illustrated in the drawing.

In this drawing, FIG. 1 is a transverse cross-sectional view taken along line 1—1 indicated in FIG. 2, which is a longitudinal cross-sectional view of a converter according to this invention provided with means for seeding the gas and for removal of the seeds from the gas. FIG. 3 shows a cross sectional view taken along lines 2—2 indicated in FIG. 4, which shows a longitudinal cross sectional view of another embodiment of this invention. In FIG. 5 is shown a longitudinal cross-sectional view of a converter serving to produce three-phase current. A perspective somewhat diagrammatic, view of an electromagnetic gas-dynamic converter functioning as an asynchronous three-phase generator is depicted in FIG. 6. Another perspective and also somewhat diagrammatic view of an electromagnetic gas-dynamic-energy converter serving as a traveling wave amplifier and oscillator is drawn in FIG. 7. A schematic cross sectional view of a converter with self-excitation is presented in FIG. 8. The perspective view of an electromagnetic gas-dynamic energy converter serving for reduction of the sonic boom and drag of aircraft is shown in FIG. 9.

In detailed consideration of the above listed figures, it can be seen that, in FIG. 1, gas duct 3 is provided with nozzle 4, perpendicular thereto, which nozzle is used to set the gas in the duct in a state of rotation, as indicated with the arrow 5. The windings 6, 7, 8, 9, 10, and 11, each consisting of turns wound in a plane tangential to the surface of the duct 3, are fastened to that duct. The ionizing electrode 12, partly broken away is shown diagrammatically. It is insulated from duct 3, but the insulation is not shown. Similarly, the channels 13, serving for regaining the seeds, usually flyash, from the gas stream are insulated from duct 3, since they serve as the collecting electrodes. Also the insulation of these channels 13 from duct 3 is not shown. The hopper for collection of the seeds is designated with 14.

In the longitudinal sectional view of the same energy converter it can be seen that the gas arriving through nozzle 4 is set in rotation indicated with arrow 15. The gas is ionized by means of the corona discharge taking place between electrodes 12 and 16. These electrodes are connected to the terminals 17 and 18 respectively and are insulated from duct 3 by means of insulating bushings merely indicated with the numerals 19, 20. The collecting electrodes consisting of channels 13, are connected to the terminal 21. The seeds precipitated on channels 13 fall into hopper 14, from which they fall into screw conveyor 22, which transports them, via tube 23, into nozzle 24, that seeds the gas stream. In FIG. 2 can also be seen the side views of windings 6 and 9. The lines of magnetic force, essentially perpendicular to the surface of duct 3, are indicated with the numerals 25, 26.

In the transverse cross sectional view of FIG. 3 it can be seen that nozzle 27 introduces the gas stream perpendicularly to the longitudinal axis of duct 28. In this embodiment of the energy converter the ionizing electrodes 29, 30 are in the nozzle not in the gas duct. Gas duct 28 carries a single cylindrical winding 31. The insulation of the electrodes 29, 30 from the nozzle 27 is not shown.

In the longitudinal cross-sectional view of same energy converter it can be seen that electrodes 29, 30, whose insulation from the nozzle 27 is not shown, are connected to the terminals 32, 33, respectively. The rotating gas stream, whose rotation is represented with arrow 34, is subject to a magnetic flux produced by cylindrical coil 31. The line of magnetic force of this flux are marked with 35, 36. The collecting electrode 37 is connected to terminal 38 and insulated from the wall of duct 28 by means of insulating bushing 39, which is merely indicated diagrammatically.

In the longitudinal cross section of the three-phase energy converter shown in FIG. 5, it can be noticed that duct 40 has three constrictions 41, 42, 43, in which the pairs of ionizing electrodes, 44 and 45, 46 and 47, 48 and 49, are mounted respectively. While ionizing electrodes 44, 46, and 48 are made of metallic meshes insulated from duct 42, the ionizing electrodes 45, 46, and 47 consist of metallic vanes inclined toward the direction of the axis of gas duct 40, so that the gas stream is set in rotation. The rotation of the gas stream is indicated with the curved arrow lines 50, 51, 52. Arrow 53 shows the exit of the gas stream. The collecting electrodes 54, 55, 56 are insulated from gas duct 40 and connected by means of the conductors, via insulating bushings 60, 61, and 62 (indicated merely diagrammatically), to the primary windings 63, 64, 65, of a transformer. The secondary windings 66, 67, 68 of the same transformer are connected to the terminals 69, 70, and 71, from which the load is supplied. The tertiary windings 72, 73, and 74 of the same transformer serve to supply the ionizing voltage to the electrode pairs, 44 and 45, 46 and 47, 48 and 49, respectively. All these electrodes are, naturally, insulated from gas duct 40, and their respective bushings are designated with 75, 76, 77, 78, 79, 80. At the constrictions 41, 42, and 43, are mounted the DC excitation coils 81, 82, 83, 84, 85, 86, which are all simple cylindrical coils connected in series to the terminals 87, 88, by means of the conductors 89, 90, 91, 92, 93, 94, 95.

In the perspective, somewhat diagrammatic view of FIG. 6, it is shown that gas duct 96 contains the ionizing electrodes 97 and 98, and the collecting electrode 99, all having the form of metallic wire meshes connected via insulating bushings merely indicated with the numerals 100, 101, 102 to terminals 103, 104, and 105, respectively. The duct is surrounded with three windings 106, 107, 108, one for each phase. The ends of these windings 109, 110, 111, are connected together in star connection, whereas the other ends of the windings are connected to the terminals 112, 113, and 114, which are provided for connection to the line which this energy converter, functioning as an asynchronous generator, is to supply with electric power.

In FIG. 7, showing a perspective view of an energy converter functioning as a traveling wave amplifier and oscillator of high frequency, it can be realized that duct 115 contains the ionizing electrodes 116, and 117, and the collecting electrode 118, which are connected via, the diagrammatically shown, insulating bushings 119, 120, 121, to the terminals 122, 123, and 124. Gas duct 115 carries the helical winding 125, beginning at terminal 126 and ending at the terminal 127. These terminals are connected to a source of traveling waves, which is not shown. Also the source of the ionizing potential for electrodes 116, 117 is not shown, for simplicity.

The longitudinal cross sectional view drawn in FIG. 8 serves to show that self-excitation of this energy converter is possible. Nozzle 128, is perpendicular to gas duct 129, which carries the excitation windings 130 and 131. Gas duct 129 comprises the ionizing negative electrode 132 which is insulated from duct 129 by means of insulators 133 and 134. The positive ionizing electrode 135 and the collecting electrode 136 are not insulated from gas duct 129, which in this case is metallic. Due to the short distance between the electrodes 132 and 135 a corona discharge between them takes place continually.

The perspective view of FIG. 9 shows the application of this energy converter for reduction of the sonic boom and drag of aircraft. It will be realized that gas duct 137 is actually the exhaust tube of a thermal engine, such as a jet engine, propelling the aircraft. The gas duct 138 carries the cylindrical excitation windings 138 and 139, corresponding to the windings 130, 131 of the preceding FIG. 8. The principle of self-excitation, illustrated in the preceding figure, is applied to the application shown in FIG. 9. Consequently, the negative ionizing electrode 140 is insulated from the metallic, but nonferrous gas duct 137, by means of the insulators 141 and 142, whereas the positive ionizing electrode 143 is directly connected to the gas duct 137. Due to the closeness of the electrode 140, 143 a continual corona discharge takes place between them. There is no collecting electrode in this embodiment. The collecting electrode is replaced with the gas duct itself. For this purpose the ions are deviated toward the wall of the duct near its outlet by means of the toroidal coil 144. Also for same purpose, metallic straps 145 are welded to the inside wall of the gas duct 137, near its outlet.

In the preceding design variations of this energy converter, in dependency on the temperature of the gas, the ducts are made either of ceramic materials, or of metals resistant against high temperatures. The duct and the vanes installed in it to achieve rotation of the gas stream may be cooled with water, air or other fluids. It is convenient to constrict the duct at locations of the ionizing electrodes, since an underpressure in the gas lowers the voltage required for ionization, and the greater gas velocity prevents the slippage of positive ions upstream toward the negative electrode. It is also convenient to use ducts of elliptical cross section in order to reduce the reluctance of the magnetic path. While the electrostatic potential imparted to the positive ions grows with the voltage on the negative ionizing electrode and with the length of the duct, the potential gained by them by rotation in the magnetic field is proportional to their velocity and to the length of the duct, as well as to the density of the magnetic flux. Intensive magnetic fields of the order of 30,000 to 60,000 Gauss must be used because of the low electrical conductivity of the gas. Due to the rotation of the gas stream some of its positive ions will be thrown, by the centrifugal force, toward the wall. But, since some positive ions will attach themselves to the wall, they will create a space charge preventing further deposition of positive ions on the wall.

As has been already mentioned, this electromagnetic gas-dynamic energy converter can operate in several different ways. Its simplest mode of operation is its conversion of the kinetic energy of the gas in DC. Essentially this electromagnetic gas-dynamic converter is a combination of the electro-gas-dynamic with the magneto-hydro-dynamic converter. The first is basically a Van de Graaff type generator in which the place of the belt is taken by the gas stream. To make this combination possible means must be used to enforce the rotation of the gas stream in the gas duct. In this invention these means consist either in a nozzle perpendicular to the longitudinal axis of the gas duct, or in vanes installed within the duct and inclined toward its centerline. This is an essential feature of this invention. Once the gas stream is in a state of rotation a stationary magnetic field induces electromagnetic forces in the positive ions in the gas stream. The rotation of the gas, however, has no influence on the way in which the potential of the positive ions is raised by moving them away from the negative electrode. Thus the compatibility of the two ways of increasing the potential of the positive ions is achieved. If the gas is hot, it is to some degree ionized. Normally this degree is insufficient for the operation of this converter, therefore additional means of ionization must be used. The selection of a particular method to ionize the gas, by its exposure to a radioactive isotope, or to ultraviolet radiation, or to any other ionizing eelctromagnetic radiation has no influence on the mode of operation of this converter. The most convenient method to ionize the gas appear, however, that by corona discharges. The positive ions created in such discharge flow downstream toward the collecting electrode. The negative ions, usually electrons are neutralized on the positive ionizing electrode, and are thus removed from the gas stream. As can be seen from the above described mode of operation of this converter, it can function without seeding. The purpose of application of seeding is twofold, to tie the positive ions to the seed particles and thereby to prevent their slippage toward the negative electrode, and to decrease the inner electrical resistance of the gas stream. The method of seeding, which is one of the novel features of this invention, consists in the addition of particulate matter to the gas stream at its entrance to the duct and regaining these particles by means of precipitation at the other end of the duct. Many kinds of particulate matter, such as dust, sand, salt are suitable for this purpose. The material which is considered here to be the most inexpensive and best suitable for the function is flyash of small grain size. Many gas streams coming here into consideration contain already flyash. The application of seeding, however, complicates the device, is not indispensable, and what is most important, cannot be used for three-phase operation of this device, which is considered here as its most important mode of functioning. Therefore, seeding is merely an optional feature of this invention.

The described electromagnetic gas-dynamic converter is fundamentally a high voltage generator, which could produce extra high voltage direct current to be sent through long transmission lines and be converted into three-phase current of lower voltage at its destination. There are, however, not many situations in which this scheme could be used, and the additional conversion losses could be economically justifiable. In general, it is a severe limitation of any energy converter if it can operate only on DC, since the world's electrical systems and the majority of electrical facilities are equipped for three-phase current. It is, therefore, an important advantage of this energy converter that it can operate directly on three-phase current. The flow of three-phase power is constant and so is the flow of power in the gas duct. This, however, is not the case for single-phase power. Though possible, it would be therefore wasteful to operate the converter on single-phase current. In the three-phase operation mode, the gas duct is divided in three series-connected sections, each having a pair of ionizing and one collecting electrodes. The collecting electrodes supply power to primary windings of a power transformer, whose secondary windings feed its load. Its three tertiary windings, one for each section of the duct, supply the pairs of ionizing electrodes. Since the polarity of the ionizing electrodes is changed every half cycle, also the polarity of the ions drifting along the tube is changed at the same time intervals. This energy converter has an inherently high inner impedance, therefore, its current should be fed into a high impedance load. Since commercial loads are usually of low impedance, some impedance matching device is necessary for the efficient transfer of energy from it to the load. The power transformer may constitute such impedance matching device.

If the change of polarity of the ions in the gas stream is not desired, this converter can still produce three-phase current in a slightly changed mode of operation. The ionizing electrodes are fed from the just described tertiary windings, not directly, as before, but through metallic or other equivalent rectifiers. Thus only positive ions are in the three sections of the gas duct, though their intensity fluctuates during one half period. Thus the primary windings carry three shifted in phase, fluctuating currents, but the secondary windings of the transformer carry alternating three-phase current as before, though of doubled frequency.

Another mode of operation of this device is as an asynchronous generator. In this case the three-phase windings are laid out so as to produce a traveling magnetic field, or a rotating magnetic field, or a combination of both, that is a field traveling along a helical line. In any case the ions in the gas are moved by the gas stream in the opposite direction, in which they would be moving if they were propelled by the magnetic flux alone. In this mode of operation the collecting electrode serves only for recapturing of the energy spent for ionization of the gas. This function is performed by any collecting electrode, in all designs of this invention.

If this converter is connected to a high frequency line it can function as an asynchronous generator and extract kinetic energy from a nonionized gas. Its primary winding laid out so as to produce a traveling magnetic flux causes capacitative, dielectric losses in the neutral gas molecules. These behave then as microdipoles The interaction between the traveling magnetic flux and these microdipoles which are carried by the gas stream produce the same effect as if the gas were ionized, though the efficiency of the energy conversion is relatively low.

Finally, this device can also function as a traveling wave amplifier and oscillator. For this purpose the gas duct carries a helical winding conducting traveling waves. These interact with the ions in the gas stream, through which they extract energy from the flowing gas. This mode of operation can be used when power at radio frequency is required, for such applications as induction, or dielectric heating, or for communication purposes.

The electromagnetic gas-dynamic energy converter according to this invention can be used as the initial or end stage of conventional thermal cycles of gas turbines, jet engines, diesel engines, but it is particularly convenient for application in the exhaust tubes of such engines. As described, the converter can be used for generation of direct, alternating or three-phase current of commercial power frequencies, or of high frequency. It can also be applied as a gas compressor, gas blower, liquid pump, or liquid turbine. On a small scale, the converter can be used for production of auxiliary electric power for steam, or gas turbines or jet engines. Since the converter is essentially a high voltage generator it can be used for laboratory purposes, for high voltage tests of electrical equipment, such as transformers, cables, insulators. It can also be used in the chemical industry for production of ozone, of fertilizers, of acetylene. The high voltage generated in it makes it suitable for production of X-rays, and for electrostatic precipitation. As far as this inventor knows, this device is at present the only one that makes possible the direct generation of extra high voltage three-phase current, of any frequency. Conversely, by application of high voltage high frequency currents to the converter it can produce extraordinary gas velocities, and, therefore, can be utilized as an electromagnetic gas-dynamic wind tunnel for supersonic air velocities.

This is not the only application of this energy converter to aviation. Another, seemingly more important application of this device to reduce the sonic boom and air drag of aircraft is described in more detail in what follows. The development of supersonic flight is greatly hindered by the sonic boom which causes harm to man's hearing and nervous system, and damage such as broken windows, cracked walls and the like. The sonic boom consists in the shock wave caused by the air pressure built up on the leading edge of the wings, due to stalling of the air on them. To prevent its stalling, the air must be pushed out of the way of the oncoming airfoils. The speed with which the air must step aside of the approaching edges must be greater than the speed of the aircraft itself, which moves with a velocity surpassing that of sound. The force fully suitable to do this job is the electrostatic. It propagates itself with the speed of light, which can never be surpassed by any aircraft, no matter how advanced. To make possible the application of the electrostatic forces, the neutral air molecules must be ionized first. For this purpose the metallic skin of the aircraft has to be impressed with a very high electrical potential. This potential must be of the positive sign in order to repel the heavier positive ions. The negative ions, usually the electrons are neutralized on the metallic surface of the aircraft. Obviously, a converter according to this invention, installed in one or more exhaust tubes of the jet engines of the aircraft is superbly suited for this purpose, since it produces the extra high voltage DC immediately. The modifications of the converter design required to adapt it to do this job, can be found in the description of FIG. 9 of the drawing. There, it can be seen that utmost simplification of the device is achieved by its self-excitation. Understandably, the same measure used for reduction of sonic shock waves, also reduces the air drag of the aircraft. It is applicable to helicopters, and other airborne objects. The expense of energy for ionization of the air is not too great since only a part of the oncoming air must be ionized, and the positive ions repelled for the leading edges push other neutral molecules aside. Besides the expenditure of energy for ionization is amply covered by the energy savings due to reduction of the drag. With some modifications, the same method can be applied to stationary rotating machinery.

Many other modifications, variations and changes of this invention, and its adaptation to different applications, also its different design embodiments made by addition, omission, or substitution of its elements by equivalents can be made, all in the sense of this invention and within the scope of the following claims.

I claim:

1. An electromagnetic gas-dynamic energy converter consisting of at least one tube with a nozzle tangentially introducing a stream of fluid, into said tube, which also has installed in it, vanes inclined toward the longitudinal axis of said tube, the nozzle as well as the vanes causing the fluid stream inside the tube to rotate, in addition, said rotating fluid stream passing through two metallic meshes insulated from said tube, the first of said meshes being negatively charged and the second in direction of the fluid stream being positively charged, the potential difference between said two meshes constituting the ionizing electrodes being so high as to ionize the fluid passing through them, negative ions, or electrons being neutralized on said second positive mesh electrode, while the positive ions are being carried by the fluid stream toward a third electrodes insulated from the tube and placed near its end, this third electrode being the collecting electrode, so that while the positive ions are carried by the fluid stream away from the ionizing negative electrode to which they are attracted their potential is raised up to the point at which they are picked up by the collecting electrode, said positive ions while rotating in the fluid tube are subjected to a radial magnetic flux produced by cylindrical coils suitably disposed on the fluid duct and flat rectangularly wound turns with the surface of their windings being tangential to the surface of said fluid duct, said radial magnetic flux inducing in said positive ions an electromotoric force directed in the same way as the potential difference between said negative ionizing electrode and said collecting electrode, so that the electrostatically and the electromagnetically induced potential differences in the positive ions add up, said fluid stream at its entrance into said fluid duct is seeded with particulate matter such as flyash of small grain size, which is regained by precipitation at the end of said tube.

2. An electromagnetic gas-dynamic converter as in claim 1, with said gas duct being divided into three parts, which are connected in tandem and passed by the same gas stream, each of said parts of said gas duct having a pair of ionizing electrodes impressed by the voltage of one phase of a three-phase system, and each part of said gas duct having a separate collecting electrode, the three collecting electrodes being connected to the primary windings of a three-phase transformer, the secondary three-phase windings of said transformer being connected to the electrical load carried by said converter.

3. An electromagnetic gas-dynamic converter as in claim 1, with said gas duct carrying a three-phase winding so distributed along said duct as to create a traveling magnetic field when said windings are connected to a three-phase line, said traveling magnetic field inducing in said gas stream, which is conductive because of the presence of positive ions in it, a current which is oppositely directed that of the flow of positive ions in said gas stream, so that, as a consequence of the interaction of said positive ions with said traveling magnetic field, said converter acts as an asynchronous generator which can supply power to the line at the frequency prevailing on said line, said gas duct also being covered with a helical winding connected to a source of traveling waves which through their interaction with the positive ions in the gas stream cause said helical winding to function as a traveling wave amplifier and oscillator at high frequency, with said function capable of being reversed, so that when high frequency current is fed into said helical windings the gas stream in the gas duct can be accelerated to supersonic velocities to serve for the purposes of a wind tunnel, as well as for a gas compressor, and also for a fluid pump.

4. An electromagnetic gas-dynamic energy converter as in claim 1, serving for the purpose of charging the metallic surface of an aircraft as well as those of other airborne objects with extra high positive potential serving to ionize a part of the air passed by said aircraft, so that its positive ions are pushed aside by their repulsion from positively charged surface of said aircraft, and in their turn, the positive ions push aside neutral air molecules so that as an effect the sonic boom caused by said aircraft flying at supersonic velocities and the air drag on said aircraft is reduced, with said converter adapted for this purpose by having one of its ionizing electrodes connected to its gas duct which also serves as its own collecting electrode, said gas duct having a toroidal coil placed near its end, said toroidal coil deviating said positive ions in the gas stream toward the wall of said gas duct, which at its end is provided with conductively attached to it and radially disposed metallic bars picking up said positive ions in said gas stream.

References Cited

UNITED STATES PATENTS

| | | | |
|---|---|---|---|
| 3,176,169 | 3/1965 | Neitzel | 310—11 |
| 3,177,654 | 4/1965 | Gradecak | 244—42 |
| 3,360,220 | 12/1967 | Meyer | 244—42 |

DAVID X. SLINEY, Primary Examiner